(12) United States Patent
Philbin et al.

(10) Patent No.: US 8,407,527 B1
(45) Date of Patent: Mar. 26, 2013

(54) DIAGNOSING HARDWARE FAULTS IN A DATA STORAGE SYSTEM

(75) Inventors: Brion Philbin, North Grafton, MA (US); Michael Manning, Hopkinton, MA (US); Ashok Tamilarasan, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 461 days.

(21) Appl. No.: 12/494,467

(22) Filed: Jun. 30, 2009

(51) Int. Cl.
*G06F 11/00* (2006.01)
(52) U.S. Cl. .......................................... 714/43
(58) Field of Classification Search ...................... 714/43
See application file for complete search history.

(56) References Cited

U.S. PATENT DOCUMENTS

| | | | | |
|---|---|---|---|---|
| 5,862,145 | A * | 1/1999 | Grossman et al. | 714/704 |
| 7,673,185 | B2 * | 3/2010 | Kalwitz et al. | 714/43 |
| 7,990,959 | B2 * | 8/2011 | Shimada | 370/389 |
| 2004/0153849 | A1 * | 8/2004 | Tucker et al. | 714/43 |
| 2004/0199834 | A1 * | 10/2004 | Fukae | 714/699 |
| 2006/0048018 | A1 * | 3/2006 | Hosoya et al. | 714/48 |
| 2007/0088974 | A1 * | 4/2007 | Chandwani et al. | 714/6 |
| 2007/0174719 | A1 * | 7/2007 | Inoue et al. | 714/42 |
| 2008/0225701 | A1 * | 9/2008 | Pimlott | 370/221 |
| 2009/0204743 | A1 * | 8/2009 | Inoue et al. | 711/100 |
| 2010/0002588 | A1 * | 1/2010 | Cantwell et al. | 370/241 |

* cited by examiner

*Primary Examiner* — Scott Baderman
*Assistant Examiner* — Neil Miles
(74) *Attorney, Agent, or Firm* — Krishnendu Gupta; Jason A. Reyes; Deepika Bhayana

(57) ABSTRACT

Hardware faults in data storage systems are diagnosed. User I/O errors are received. Disk drive port error counters, primary port error counters, and expansion port error counters are read. A user I/O error threshold is modified based on the error counter readings. Depending on the type of errors counted, the user I/O error threshold may be increased or decreased. Once a first quantity of user I/O errors exceeds the modified user I/O error threshold, a faulty component is identified.

16 Claims, 9 Drawing Sheets

DIAGNOSING HARDWARE FAULTS IN A DATA STORAGE SYSTEM

TECHNICAL FIELD

This invention relates to diagnosing hardware faults in a data storage system.

BACKGROUND

As is known in the art, a typical storage system includes one or more racks of storage devices or enclosures. A loop, such as a fibre channel loop, is a common topology in which the enclosures of a storage system are connected. Communication signals traverse the loop in one direction and pass from enclosure to enclosure in a daisy-chain fashion. Enclosures receiving communication signals targeted for another enclosure forward those signals along the loop.

Previously, the process to identify faulty backend loop cables and LCCs was manually driven. Technical support personnel would make a guess about a faulty component based on soft or hard failure errors along with trial replacements of hardware. This reactive process is time consuming, error prone and occasionally expensive in the case where all hardware components are replaced.

SUMMARY

Hardware faults in data storage systems are diagnosed. User I/O errors are received. Disk drive port error counters, primary port error counters, and expansion port error counters are read. A user I/O error threshold is modified based on the error counter readings. Depending on the type of errors counted, the user I/O error threshold may be increased or decreased. Once a first quantity of user I/O errors exceeds the modified user I/O error threshold, a faulty component is identified.

A faulty component may be detected earlier and removed from the loop in an expedient manner. A non-faulty component may be given additional time to complete a more thorough fault isolation process.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Storage systems facilitate user inputs and outputs (user I/O). Examples of user I/O include writing to a disk and reading from a disk. Errors may prevent a user from successfully writing to a disk or reading from a disk. These errors may be caused by a faulty component such as a faulty disk, or by a faulty intermediate component such as a faulty cable connecting the disk to the rest of the storage system.

Much time may be required to isolate the faulty component. This is especially true in large and complex storage systems. Unfortunately, before the faulty component is isolated, multiple disks may start reporting errors during user I/O. Conventionally, when the user I/O fails too many times, or when a quantity of received user I/O errors exceeds a user I/O error threshold, a system will usually bypass the disks and remove the disks from a back end loop. These disks may be reported as faulty, and may very well end up being replaced. Thus, conventionally, if the user I/O error threshold is exceeded before the isolation process is completed, it is unclear whether the disk is truly faulty. An example conventional scenario may be that the cable is defective, and the isolation process has yet to locate the defective cable before the user I/O error threshold is exceeded, such that a good disk drive may be bypassed before successful isolation has taken place, which results in an inefficient use of resources.

One or more implementations of the enhanced technique described herein may be used in at least some cases to help prevent false positives, such as when good disk drives are identified as defective, or dropped off a fibre channel backend loop. This is accomplished by modifying a user I/O error threshold based on reading error counters.

In at least some embodiments, errors may be categorized into three categories: disk errors, cable errors, and ambiguous errors. Disk errors are errors which are solely attributable to the disk, such as the disk not spinning. Cable errors are errors which are solely attributable to the cable, such as an unrecognizable command received after attempting to read the disk. Ambiguous errors are errors which may be attributable to the disk or the cable, and further isolation is required. An isolation process in at least some embodiments is described below.

Figure 1:
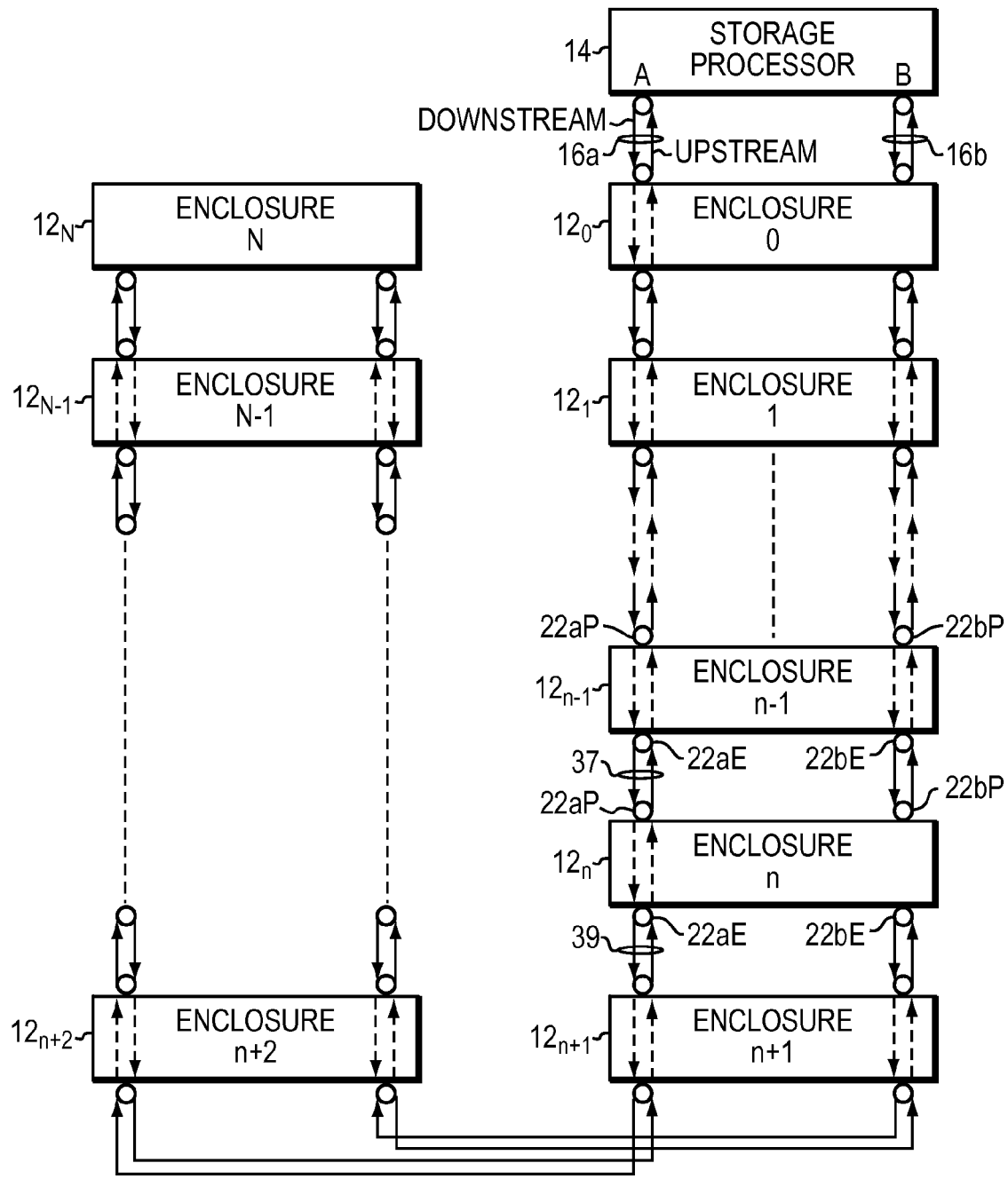
FIG. 1 is a block diagram of system having a plurality of enclosures serially interconnected to the storage processor through a fibre channel loop and programmed to automatically diagnosing faults therein in accordance with the invention.

FIG. 1 illustrates a non-limiting example of a storage system that may be used with one or more implementations of the enhanced technique. The storage system includes a plurality of, here N+1, disk drive enclosures $12_0$-$12_N$ coupled to a pair of redundant ports, port A and port B of a data storage processor 14 through fibre channel loops 16a and 16b, respectively, as shown. As shown, each fibre channel loop 16a and 16b has a downstream path and an upstream path, as indicated.

Figure 2:
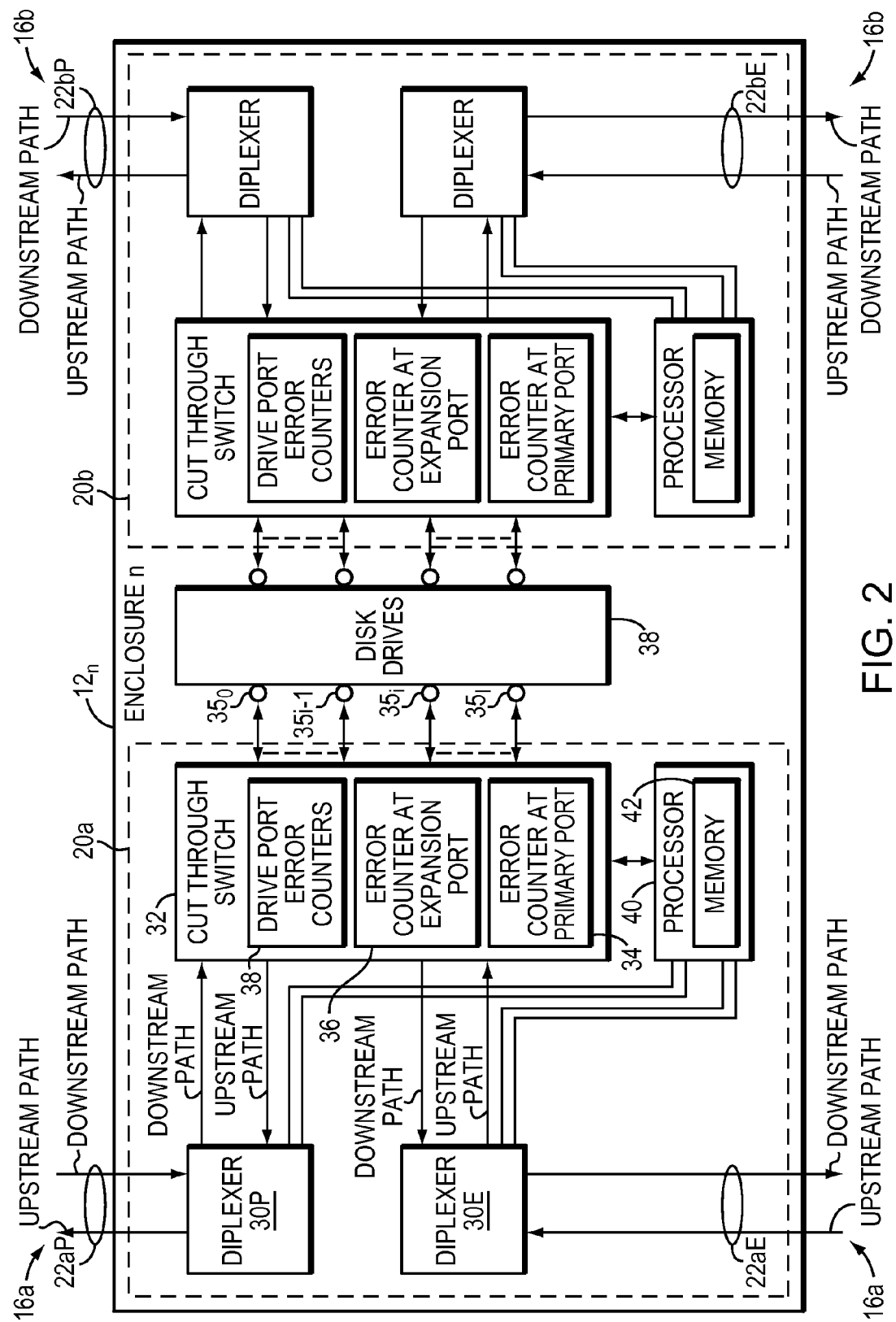
FIG. 2 is a diagram of an exemplary one of the enclosures of the system of FIG. 1.
Figure 3:
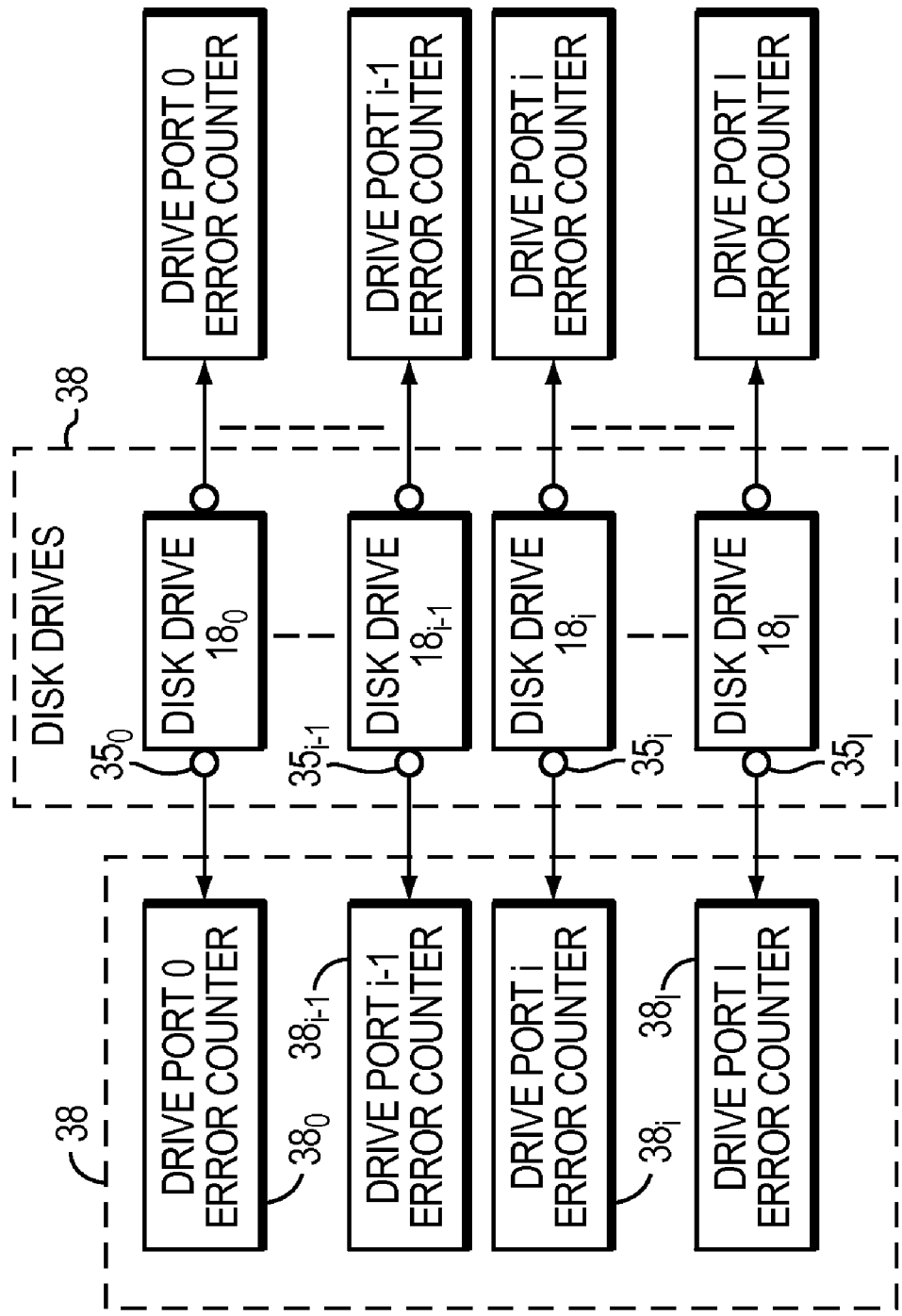
FIG. 3 is a diagram of a portion of the exemplary enclosure of FIG. 2, such portion showing disk drives the enclosures coupled to a plurality of disk drive port error counters in the enclosures.

In general, each of the enclosures $12_0$-$12_N$ is identical in construction, an exemplary one thereof, here enclosure $12_n$ is shown in FIG. 2 to include, as shown in FIG. 3, a plurality of, here I+1, dual ported disk drives $18_0$-$18_I$. Referring again to FIG. 2, each set of the dual ports $35_0$-$35_I$ is coupled to a corresponding one of a pair of link control cards (LCCs) 20a, 20b. Applications for the disk drives enclosures include, for example, JBOD (Just a Bunch Of Disks), RAID (Redundant Array of Independent Disks), and SAN (Storage Area Network).

One of the pair of LCCs, for example LCC 20a, is coupled in fibre channel loop 16a through a primary port 22aP and an expansion port 22aE while other one of the pair of LCCs, for example LCC 20b, is coupled in fibre channel loop 16b through a primary port 22bP and an expansion port 22bE to provided conventional fibre channel loops, see for example, U.S. Pat. No. 6,567,890 entitled "Fibre channel port by-pass selector section for dual ported disk drives", inventors Mulvey, et al., issued May 20, 2003, assigned to the same assignee as the present invention.

Referring again to FIG. 2 as well as to FIG. 1, and considering an exemplary one of the pair of LCC, here LCC 20a, such LCC 20a includes a pair of diplexers 30P and 30E coupled to the primary port 22aP and an expansion port 22aE, respectively, as shown. Each one of the diplexers 30P and 30E is here, for example, a diplexer such as that described in U.S. Pat. No. 5,901,151, entitled "System for orthogonal signal multiplexing", inventor Bleiweiss, et al., issued May 4, 1999, now assigned to the same assignee as the present inventions. The diplexers 30P and 30E are coupled to a cut through switch 32, here for example, that manufactured by PMC-Sierra, Burnaby, B. C., Canada. Such cut through switch includes: an error counter 34 for counting errors at the primary port 22aP; an error counter 36 for counting errors at the expansion port 22aE; and a set 38 of, here I+1, a disk drive error counters 38, here disk drive error counters $38_0$-$38_I$, shown in FIG. 3 for counting errors at the drive ports $35_0$-$35_I$, respectively of disk drives $18_0$-$18_I$, respectively as shown.

A processor 40 (FIG. 2) having a memory 42 for storing a program to be described in connection with FIGS. 4A-4C, 5A-5D, and 6 is connected to the cut through switch 32, included in the LCC 20a, as shown.

As will be described below, the processor 40 sequentially reads the disk drive port error counters 38, the primary port error counter 34 and the expansion port error counter 36 in each one of the enclosures $12_0$-$12_N$ to determine whether errors counted in any one of such counters exceeds a predetermined threshold over a predetermined period of time. Also processor 40 processes the counters 34, 36 and 38 to isolate faults in either one of the expansion ports 22aE, one of the primary ports 22aP, one of the disk drive ports $35_0$-$35_I$, or a cable 35, 37 of the fibre channel loop connecting a pair of the enclosures $12_0$-$12_N$.

Figures 4A, 4B:
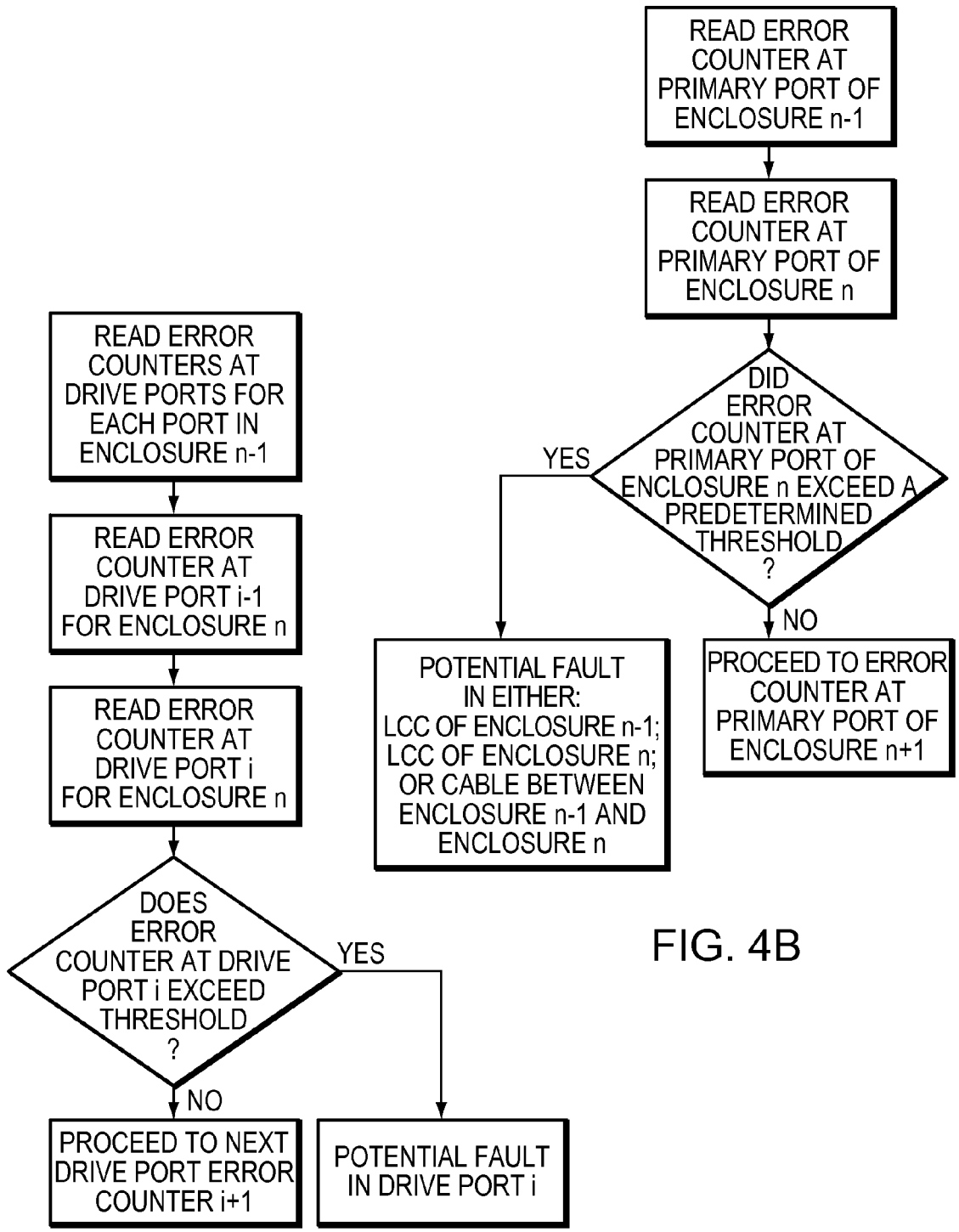
FIGS. 4A, 4B and 4C are flowcharts of a method used to detect potential sources of faults in the system of FIG. 1 at a point in time in accordance with the invention.

Referring to FIG. 4A, the process for determining errors in disk drive ports of an exemplary one of the enclosures $12_0$-$12_N$, here for example enclosure $12_n$, at a point in time, is shown. The process begins by reading the error counters at the drive ports for each of the drive ports in enclosure $20_{n-1}$. Next, the process reads the error counter at drive port i−1 for enclosure $20_n$; Next, the process reads the error counter at drive port i for enclosure $12_n$; Next the process determines whether the error counter at drive port i exceeds a predetermined threshold. If the predetermined threshold is exceeded, a potential fault is noted in drive port i; otherwise, if the predetermined threshold is not exceeded, the process proceeds as described above for the next successive disk drive port error counter i+1

Referring now to FIG. 4B, the process for determining errors at the primary port 22aP of an exemplary one of the enclosures $12_0$-$12_N$, here for example enclosure $12_n$, at a point in time, is shown. First, the process reads the error counter 34 (FIG. 2) at the primary port 22aP of enclosure $12_{n-1}$. Next, the process reads the error counter 34 at primary port 22aP of enclosure $12_n$. Next, the process determines whether the error counter 34 at the primary port 22aP of enclosure $12_n$ exceeds a predetermined threshold. If the predetermined threshold was exceeded, the process identifies a potential fault at either: The LCC of enclosure $12_{n-1}$; the LCC of enclosure $12_n$; or the pair of cables 37 (FIG. 1) in the downstream path and upstream path between enclosure $12_{n-1}$ and enclosure $12_n$; otherwise, if the predetermined threshold was not exceeded, the process proceeds to the error counter 34 at primary port 22aP of the next downstream enclosure, enclosure $12_{n+1}$.

Figure 4C:
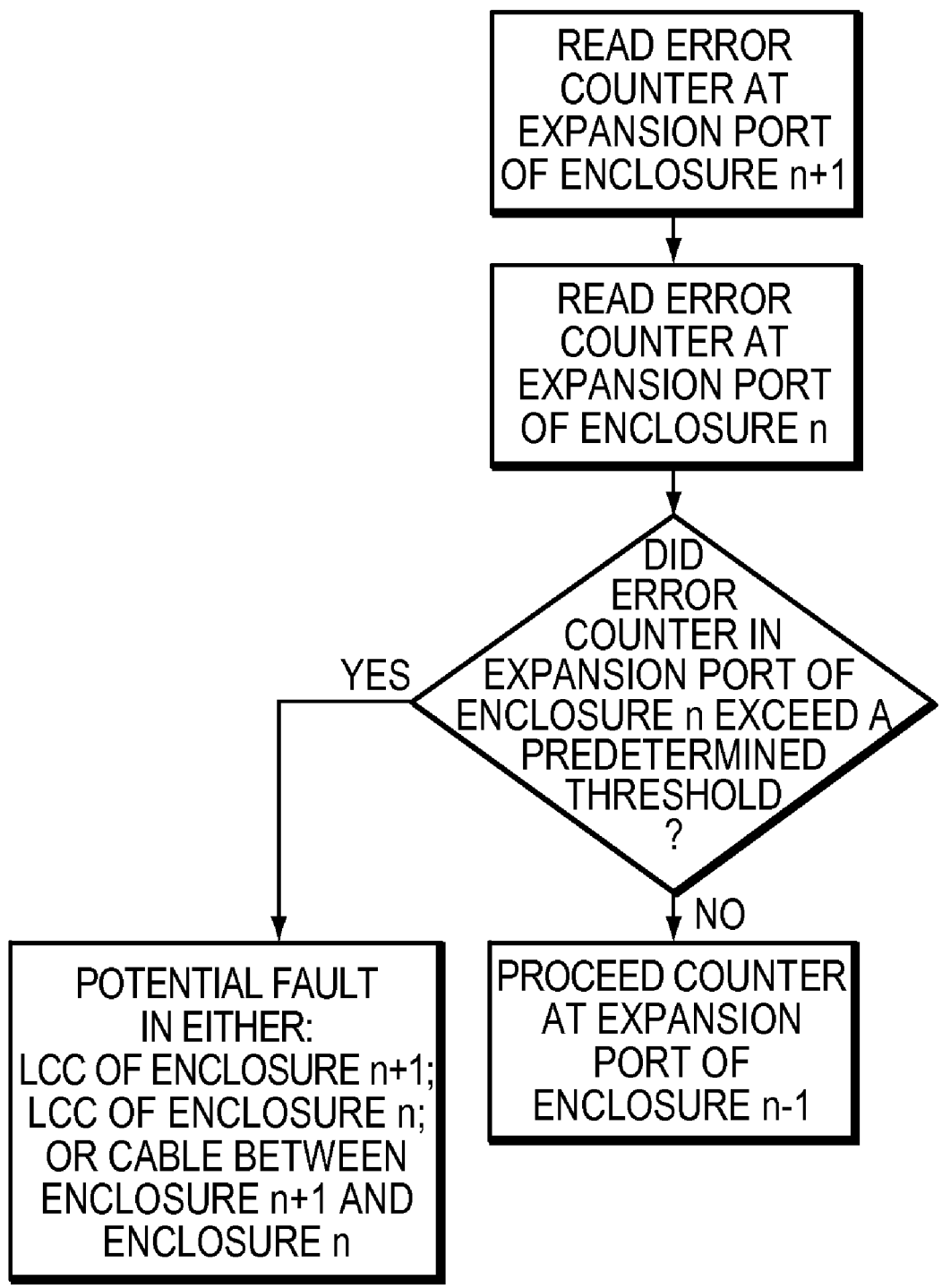

Referring now to FIG. 4C, the process for determining errors at the expansion port 22aE of an exemplary one of the enclosures $12_0$-$12_N$, here for example enclosure $12_n$, at a point in time is shown. First, the process reads the error counter 36 at the expansion port 22aE at enclosure $12_{n+1}$. Next, the process reads the error counter 36 at the expansion port 22aE of enclosure $12_n$. Next, the process determines whether the error counter 36 at the expansion port 22aE of enclosure $12_n$ exceeded a predetermined threshold. If the predetermined threshold was exceeded, the process identifies a potential fault in either: the LCC of enclosure $12_{n+1}$; the LCC of enclosure $12_n$; or the pair of cables 39 (FIG. 1) in the downstream path and upstream path between enclosure $12_{n+1}$ and enclosure $12_n$. On the other hand, if the predetermined threshold was not exceeded, the process proceeds to the counter 36 at the expansion port 22aE of the next succeeding downstream enclosure $12_{n-1}$.

Figure 5A:
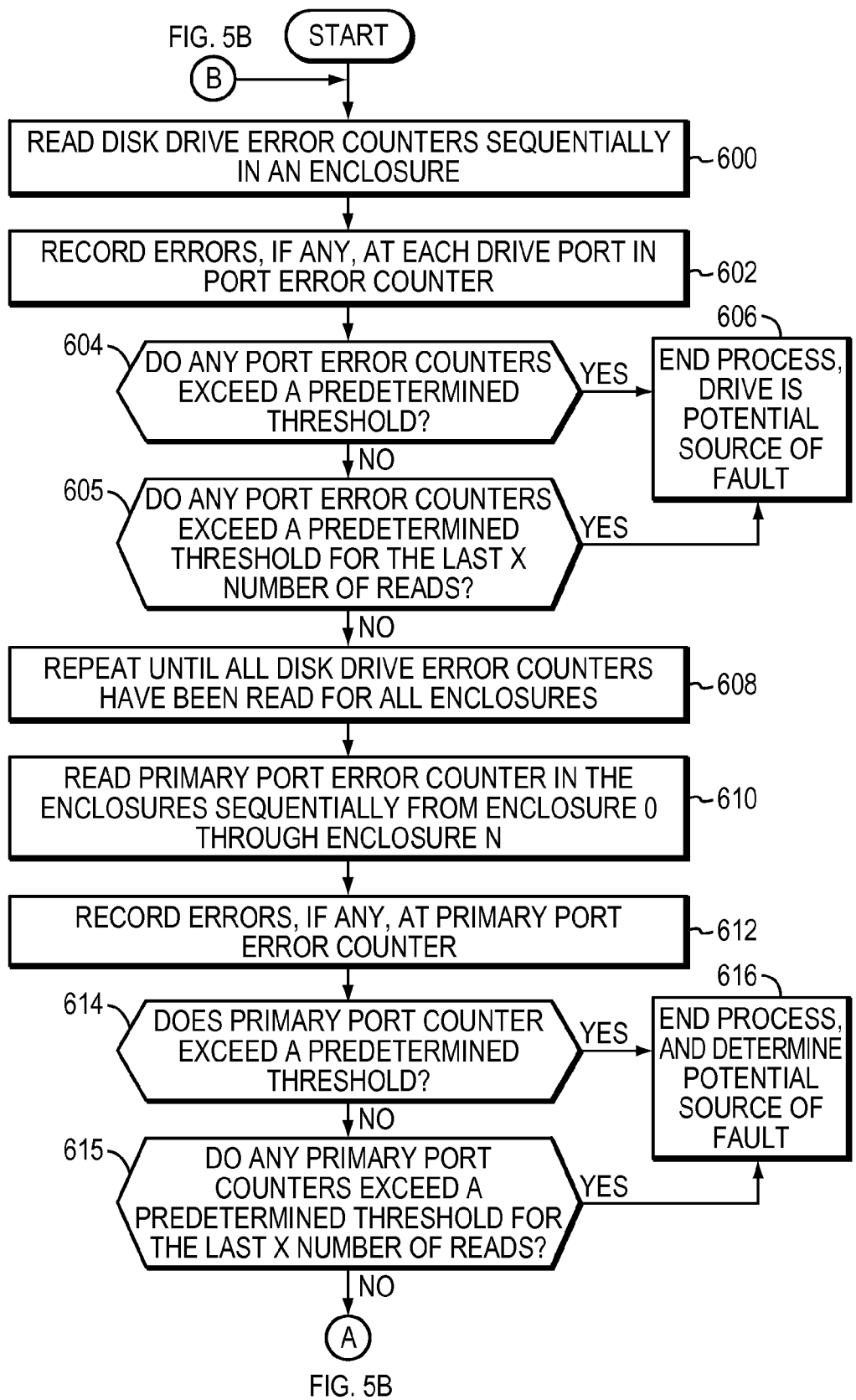
FIGS. 5A and 5B are flowcharts of a method used to detect potential sources of faults in the system of FIG. 1 over a predetermined period of time in accordance with the invention.
Figure 5B:
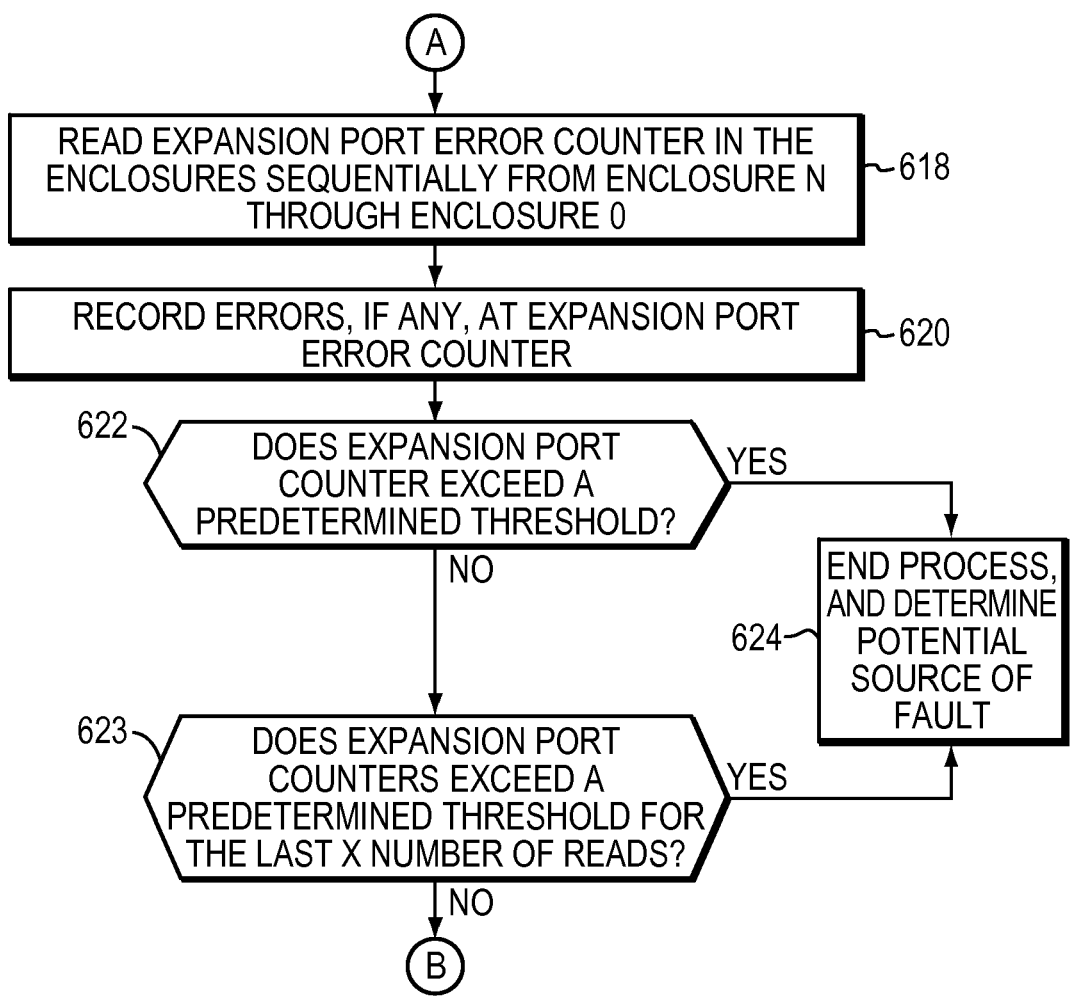

Referring now to FIG. 5A, a process for automatically diagnosing errors in the enclosures or in the cables interconnecting the enclosure over time is shown. The process begins by reading the disk drive error counters $38_0$-$38_I$ sequentially in an enclosure, Step 600. The process records errors, if any, at each drive port $35_0$-$35_I$ in the corresponding disk drive port error counter $38_0$-$30_I$, respectively, Step 602. The process determines whether any of the port counters $38_0$-$30_I$ has a count exceeding a predetermined threshold as described above in connection with FIG. 4A, Step 604. If the any of the port counters $38_0$-$30_I$ has a count exceeding a predetermined threshold, the process ends and a potential fault is identified as described above in connection with FIG. 4A, Step 606. On the other hand, if none of the port counters $38_0$-$30_I$ has a count exceeding the predetermined threshold, the process determines whether any of the port error counters exceeds a predetermined threshold for the last X number of reads of such counters, where X is a predetermined number, for example 3, repeats Steps 602-604 for the remaining enclosures, Step 608.

Next, the process reads the primary port 22aP error counter 34 sequentially for all enclosures $12_0$-$12_N$, as described above in connection with FIG. 4B, Step 610. The process records errors, if any, in the primary port counters 34, Step 612. The process determines whether any primary port counter 34 exceeds a predetermined threshold, as described above in connection with FIG. 4B, Step 614. If any primary port counter 34 exceeded the predetermined threshold, the process ends and a potential fault is detected as described above in connection with FIG. 4B, Step 616. On the other hand, if none of the primary port counters 34 exceeded the predetermined threshold, no fault is detected.

Next the process determines whether any of the primary port counters exceeds a predetermined threshold for the last X number of reads of such counters, where X is a predetermined number, for example 3, Step 615. If any of the primary port error counters exceeds a predetermined threshold for the last X number of reads of such counters, the process ends and a potential fault is identified as described above in connection with FIG. 4A, Step 616. On the other hand, referring to FIG. 5B, if none of the primary port error counters exceeds the predetermined threshold for the last X number of reads of such counters the process reads the expansion port counters 36 in the enclosures sequentially as described above in connection with FIG. 4C, Step 618. The process records errors, if any in the expansion port counters 36, Step 620.

Next, the process determines whether one of the expansion port counters 36 exceeded a predetermined threshold, Step 622. If one of the expansion port counters 36 exceeded a predetermined threshold, the process ends and a potential fault is identified as described above in connection with FIG. 4C, Step 624. On the other hand, if none of the expansion port counters 36 exceeded the predetermined threshold, the process determines whether any of the expansion error counters exceeds a predetermined threshold for the last X number of reads of such counters, where X is a predetermined number, for example 3, Step 623. If any of the primary port error counters exceeds a predetermined threshold for the last X number of reads of such counters, the process ends and a potential fault is identified as described above in connection with FIG. 4A, Step 624. On the other hand, if none of the expansion port error counters exceeds the predetermined threshold for the last X number of reads of such counters the process returns to Step 600.

Depending on the size of the storage system, it may take a considerable amount of time to completely isolate a faulty component. Meanwhile, a user may be attempting to access the storage system and receive multiple user I/O errors. Conventionally, if a user I/O fails after a certain number of retries and the fault isolation process has not yet completed, a drive may be prematurely removed from the loop or otherwise bypassed, and this may lead to a waste of resources and unnecessary downtime.

For example, conventionally, a user I/O may fail when a cable or LCC is faulty, and during fault isolation, a user I/O may be retried multiple times. In some conventional embodiments, if a user I/O fails after four retries, a drive is removed from the loop, and if the fault isolation process takes more time to complete than the four user I/O retries, a drive may be removed even though it may not be faulty.

By contrast, in accordance with the enhanced technique described herein, to allow more time for the fault isolation process to complete, the error counters may be evaluated. If, with reference to the example above, disk drive error counters indicated a low number of errors while port error counters indicated a high number of errors, it is more likely that the cause of the user I/O error is the LCC or cable. The user I/O error threshold may then be modified from four to a number sufficient to allow the fault isolation process to complete. This number may be arbitrarily set, or may be determined based on past experience (e.g., in one system it may be determined that the fault isolation process routinely requires fifty user I/O cycles to complete), among others.

Similarly, if a loop is healthy but a bad disk drive is the cause of the fault, the enhanced technique may be utilized to remove the faulty disk drive in a more expedient manner. For example, a user I/O may fail due to a faulty disk drive. While the fault isolation process is underway, disk drive error counters may start to report a high number of errors. If port error counters report only a small number of errors, it is more likely that the disk is the faulty component. The user I/O error threshold may then be set to a lower number to more aggressively bypass the disk. For example, if the default user I/O error threshold was four, the lowered user I/O error threshold may be set to two. The lower threshold may be set arbitrarily, or may be set based on the number of errors, among others. If the ratio of drive errors to port errors is extremely high (e.g. 100:1), the user I/O threshold may be set lower than if the ratio was 40:1.

Every error type need not be assigned the same weight. Using the above example, 100 LCC port type errors may be counted, while only 10 drive port type errors may be counted. If each type of error had the same weight, it may follow that the drive be given a higher I/O error threshold. However, a user may decide to increase the drive I/O error threshold only if the ratio of LCC errors to drive errors exceeds 20:1 (e.g. giving more weight to drive errors). In this case, 100 LCC errors for 10 drive errors is lower than the 20:1 ratio, so the drive I/O error threshold would not be increased.

Figure 6A:
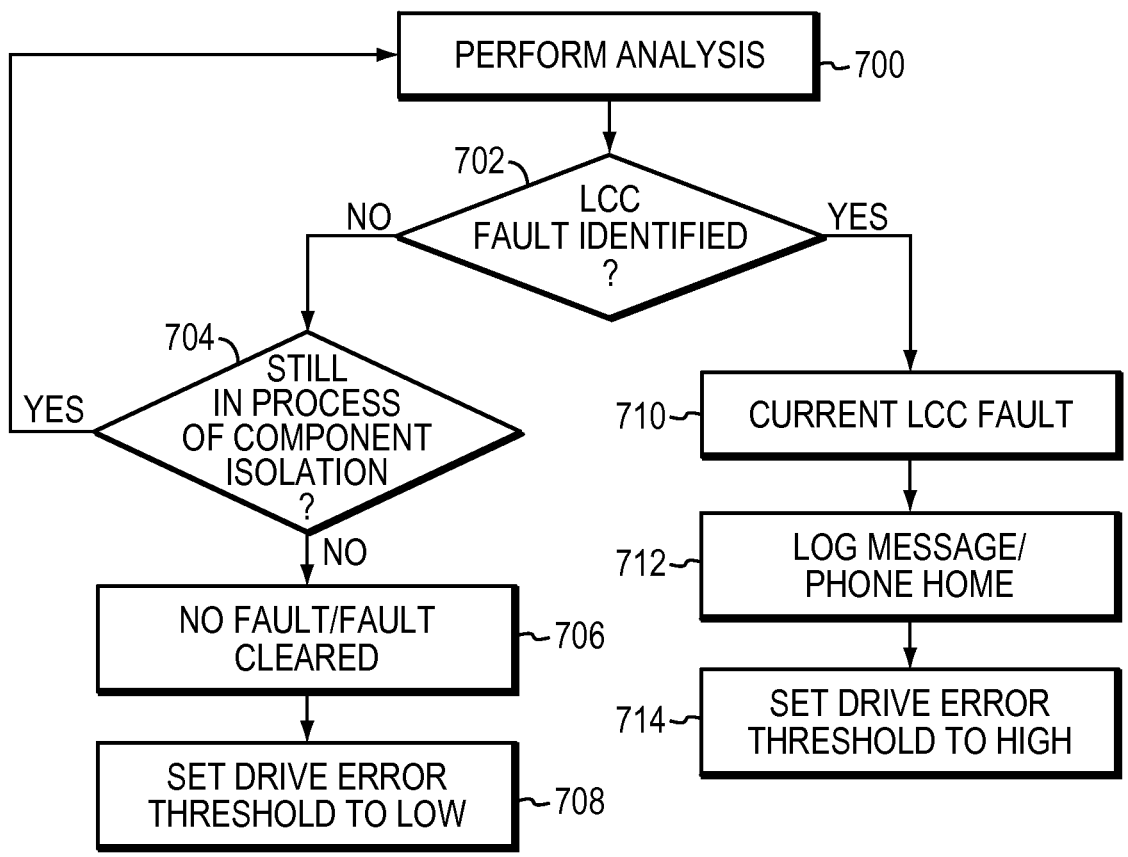
FIGS. 6A and 6B are flowcharts of a method in accordance with at least one embodiment of the invention.

FIG. 6A illustrates a process for setting a drive I/O threshold. In Step 700, an analysis is performed. The analysis determines whether or not a LCC fault is identified (Step 702). If a LCC fault is not detected, it is determined whether the component is still in the process of being isolated (Step 704). If the component is still in the process of being isolated, the process loops back to Step 700, and an analysis is performed. If the component is no longer in the process of being isolated, there is no fault determined (Step 706). This results in the drive error threshold being set to LOW (Step 708).

If the LCC is identified in Step 702, it is determined that the current LCC is at fault (Step 710). This is recorded in a log (Step 712). The drive error threshold is then set to HIGH (Step 714).

Figure 6B:
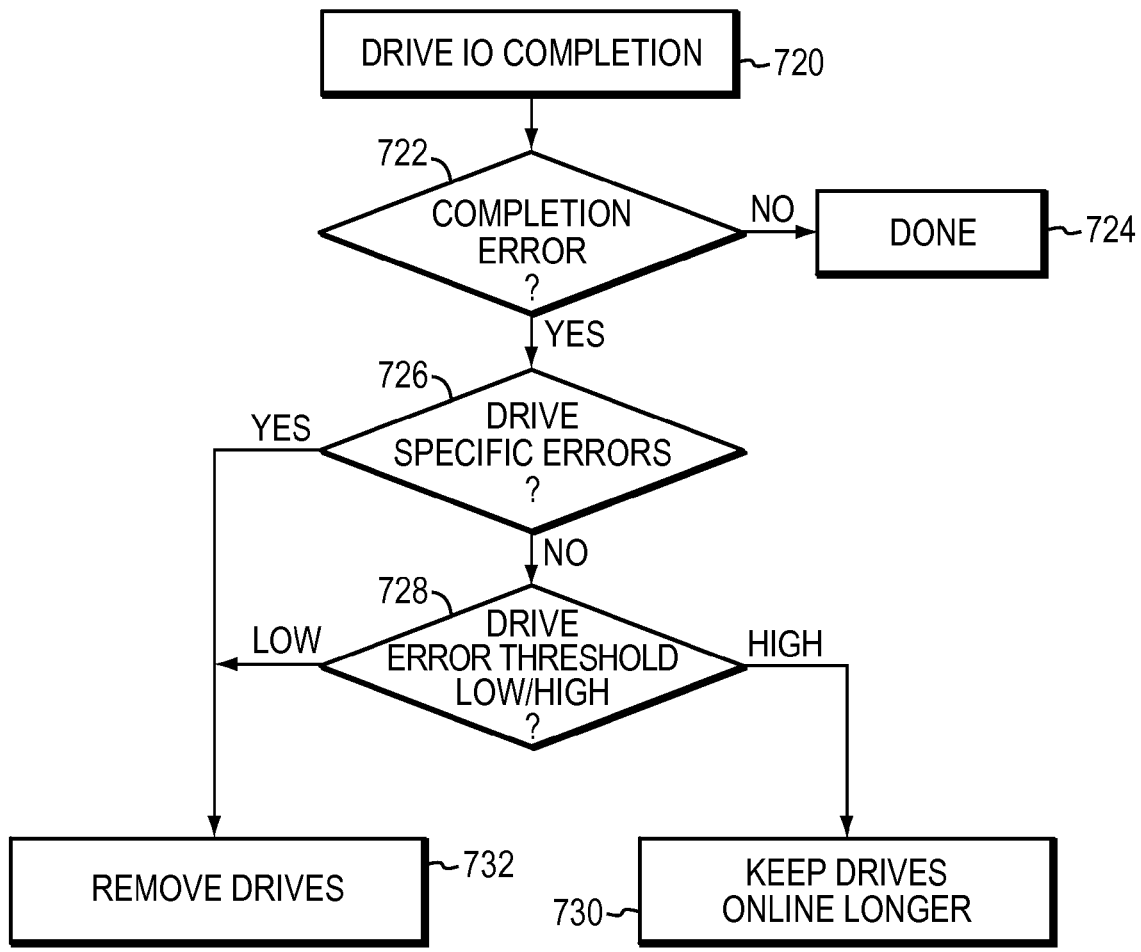

FIG. 6B illustrates how the drive error threshold affects the removal of drives. In Step 720, a drive I/O is completed. It is determined whether there were any completion errors in Step 722. If there were no completion errors, the I/O is done (Step 724). If there were completion errors, it is determined whether these were drive specific errors (Step 726). If the errors were not drive specific errors, it is determined whether the drive error threshold is LOW or HIGH (Step 728). If the drive error threshold is HIGH, the drives are kept online (Step 730). If the drive error threshold is LOW, the drives are removed (Step 732). Similarly, if the errors were determined to be drive specific errors in Step 726, the drives would be removed in this circumstance as well (Step 732).

An example of Step 726 is when it is determined that the error is the disk not spinning. This is a drive specific error, so the flowchart would proceed to Step 732, removing the drive. Instead of going through the entire fault isolation process, it is immediately known that the drive is the source of the error, and the drive may be aggressively removed.

Using the above methods, faulty disk drives can be more efficiently detected and removed. Furthermore, the above methods help reduce the chances of disk drives being falsely identified as faulty.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in diagnosing hardware faults in a data storage system, such method comprising:
 receiving user I/O errors;
 reading disk drive port error counters associated with a disk drive port, primary port error counters associated with a primary port and expansion port error counters associated with an expansion port, wherein the disk drive port is coupled to a link control card, wherein the link control card is coupled to the primary port and the expansion port, wherein the disk drive port error counters indicate a fault in a disk drive coupled with the disk drive port, wherein the primary port error counters and expansion port error counters indicate a fault in the link control card;

comparing the disk drive port error counters with the primary port error counters and expansion port error counters;

based on the comparison, determining a type of the fault; and based on the type of the fault, modifying a user I/O error threshold.

2. The method as recited in claim 1, wherein modifying a user I/O error threshold includes increasing a user I/O error threshold.

3. The method as recited in claim 1, wherein modifying a user I/O error threshold includes decreasing a user I/O error threshold.

4. The method as recited in claim 1, further comprising assigning respective weights to disk drive port errors, primary port errors, and expansion port errors.

5. The method as recited in claim 4, wherein assigning the respective weights comprises assigning different weights to disk drive port errors, primary port errors, and expansion port errors.

6. The method as recited in claim 1, wherein receiving user I/O errors comprises receiving a first quantity of user I/O errors.

7. The method as recited in claim 6, further comprising comparing the first quantity of user I/O errors to the modified user I/O error threshold.

8. The method as recited in claim 7, further comprising identifying a faulty component based on the comparison.

9. A system for use in diagnosing hardware faults, comprising:

a plurality of enclosures, each one of such enclosures having a primary port, an expansion port, a plurality of disk drives, and a link control card coupled to the primary port and to the expansion port; and the plurality of disk drives, such link control card having a cut through switch, such cut through switch having disk drive port error counters for counting errors at ports of the plurality of disk drives, a primary port error counter for counting cumulative errors at the primary port, and an expansion port error counter for counting cumulative errors at the expansion port, and wherein the primary ports and expansion ports are serially interconnected to the storage processor through a fibre channel loop; and a processor configured to receive user I/O errors, read the disk drive port error counters, the primary port error counters and the expansion port error counters in each of the enclosures, wherein the disk drive port error counters indicate a fault in the plurality of disk drives, wherein the primary port error counters and expansion port error counters indicate a fault in the link control card, compare the disk drive port error counters with the primary port error counters and expansion port error counters, based on the comparison, determine a type of the fault, and based on the type of the fault, modify a user I/O error threshold.

10. The system as recited in claim 9, wherein modify a user I/O error threshold comprises increase the user I/O error threshold.

11. The system as recited in claim 9, wherein modify a user I/O error threshold comprises decrease the user I/O error threshold.

12. The system as recited in claim 9, further comprising assigning respective weights to disk drive port errors, primary port errors, and expansion port errors.

13. The system as recited in claim 12, wherein assigning the respective weights comprises assigning different weights to disk drive port errors, primary port errors, and expansion port errors.

14. The system as recited in claim 9, wherein receiving user I/O errors comprises receiving a first quantity of user I/O errors.

15. The system as recited in claim 14, further comprising comparing the first quantity of user I/O errors to the modified user I/O error threshold.

16. The system as recited in claim 15, further comprising identifying a faulty component based on the comparison.

* * * * *